United States Patent [19]

Mazurek et al.

[11] Patent Number: 5,362,500
[45] Date of Patent: Nov. 8, 1994

[54] METHOD OF STABILIZING CHEWING GUM WITH AN ANTIOXIDANT CONTAINING TISSUE AND PRODUCT THEREOF

[75] Inventors: Pamela M. Mazurek, Chicago, Ill.; Christian Midon, Turckheim, France

[73] Assignee: Wm. Wrigley Jr. Company, Chicago, Ill.

[21] Appl. No.: 986,461

[22] Filed: Dec. 4, 1992

[51] Int. Cl.⁵ .......................................... A23L 3/3454
[52] U.S. Cl. ....................................... 426/5; 426/410; 426/541; 426/650; 426/651
[58] Field of Search ................... 426/5, 650, 410, 541, 426/651

[56] References Cited

U.S. PATENT DOCUMENTS

| | | | |
|---|---|---|---|
| 2,284,668 | 6/1942 | Martin | 229/51 |
| 2,765,233 | 10/1956 | Sarett et al. | 99/178 |
| 3,923,711 | 12/1975 | Pullen | 260/28.5 AV |
| 4,130,604 | 12/1978 | Edelman | 260/860 |
| 4,158,571 | 6/1979 | Lynch et al. | 106/271 |
| 4,174,330 | 11/1979 | Gilbert et al. | 260/28.5 A |
| 4,248,576 | 2/1981 | Birks et al. | 425/68 |
| 4,293,469 | 10/1981 | Edelman | 260/45.9 P |
| 4,315,842 | 2/1982 | Tsuchiya et al. | 260/28.5 B |
| 4,851,507 | 7/1989 | Kesling, Jr. et al. | 528/405 |
| 4,880,696 | 11/1989 | Yanidis | 428/349 |
| 4,981,734 | 1/1991 | Akao et al. | 428/35.9 |
| 5,064,698 | 11/1991 | Courtright et al. | 428/35.4 |
| 5,082,744 | 1/1992 | Akao et al. | 428/522 |
| 5,192,563 | 3/1993 | Patel et al. | 426/5 |

FOREIGN PATENT DOCUMENTS

WO90/09273  8/1990  WIPO ..................... B29D 22/00

*Primary Examiner*—Helen Pratt
*Attorney, Agent, or Firm*—Willian Brinks Hofer Gilson & Lione

[57] ABSTRACT

A wax-coated tissue paper having free antioxidant present in the wax and having coatings of wax with antioxidant on both surfaces of the tissue paper, retards oxidation and prolongs the shelf life of a chewing gum stick which is individually wrapped with the coated tissue paper.

25 Claims, No Drawings

METHOD OF STABILIZING CHEWING GUM WITH AN ANTIOXIDANT CONTAINING TISSUE AND PRODUCT THEREOF

FIELD OF THE INVENTION

This invention relates to chewing gum sticks wrapped in wax-coated tissue having antioxidant mixed with the wax. The antioxidant in the wax migrates toward the chewing gum during storage and helps prevent the oxidation of flavoring agents in the chewing gum.

BACKGROUND OF THE INVENTION

When chewing gum is placed in storage for a period of time, it is gradually exposed to the atmosphere as oxygen and other atmospheric components migrate through the packaging material and into the chewing gum. Over time, this exposure to the atmosphere causes chewing gum flavor components to oxidize and develop undesirable sensory characteristics. The oxidation of mint oils in chewing gum is of particular concern. Also, the oxidation of stick chewing gum components is a particular problem due to the high amount of exposed surface area.

Techniques have been developed for including an antioxidant in the packaging material in order to alleviate the oxidation of the chewing gum contained therein. U.S. Pat. No. 5,064,698, issued to Courtright, et al., and the corresponding PCT Publication WO 90/09273, disclose a chewing gum wrapping material prepared by laminating a foil layer and a tissue layer with a wax layer that contains 40% microcrystalline wax, 40% paraffin wax, and 20% polymeric beads, wherein the polymeric beads have been impregnated with an oxygen scavenger made from iron oxide and activated charcoal. The reference teaches that, alternatively, the polymeric beads may be impregnated with (1,1-dimethylethyl)-4-methoxy phenol (BHA) or 2,6-di-tert-butyl-para-cresol (BHT). The polymeric beads contain micropassages formed during polymerization, which facilitate their impregnation with the oxygen scavenger. The wax, which is oxygen-permeable, serves the function of immobilizing and adhering the beads on an inside surface of the tissue layer.

U.S. Pat. No. 4,880,696, issued to Yanidis, discloses the use of BHT in a flexible packaging material. The BHT is incorporated into a polymer composition that is extrusion coated onto a substrate, such as paper coated with polyvinylidene chloride. A heat seal polymer layer is placed over the antioxidant-containing layer, which prevents evaporation of the antioxidant. Eventually, the antioxidant migrates through the heat seal polymer layer to help preserve food packaged in the material.

U.S. Pat. No. 4,248,576, issued to Birks, et al., discloses coating compositions containing paraffin wax mixed with various polymer materials, for coating onto thermoplastic films of polyethylene, polypropylene or polyethylene terephthalate. The coating compositions can also contain a small amount of BHT. The coated structures can be used for packaging.

While it is known to incorporate antioxidant in a packaging material to help stabilize the contents of the package, the packaging materials and methods heretofore used have been relatively complex and expensive. There is a need or desire in the chewing gum industry for an antioxidant-containing packaging material which prolongs the shelf life of chewing gum without adding significantly to the complexity or cost of conventional packaging materials. This need is particularly apparent in the case of chewing gum sticks which, due to their high surface to volume ratios, require a relatively high quantity of packaging material.

SUMMARY OF THE INVENTION

The present invention is directed to an antioxidant-containing packaging material which, due to its relative simplicity and inexpensiveness, is uniquely suited for the packaging of individual chewing gum sticks. The packaging material of the invention includes a middle layer of tissue paper and two outer layers of wax laminated to both sides of the tissue paper. Each of the two outer layers contains a small quantity of free antioxidant. By "free antioxidant" it is meant that the antioxidant is not encapsulated except for being mixed with the wax.

Compared to previous antioxidant-containing packaging materials, the present invention is characterized by two features which reduce the complexity and cost of the packaging material. First, the present invention does not include a metal foil or equivalent structural support layer. The use of wax layers on both sides of the tissue paper increases the stiffness and strength of the packaging material to a point where a metal foil or equivalent structural support layer is not needed.

Second, as stated above, the present invention uses free antioxidant which has not been encapsulated except for being mixed with the wax. Because the present invention involves coating both sides of the tissue paper with wax instead of one, a correspondingly higher amount of wax is required. However, the amount of antioxidant needed in the inventive packaging material to prolong the shelf life of the chewing gum, is no greater than in the prior art. Because the antioxidant is dispersed among a much higher quantity of wax, the rates of diffusion and evaporation of antioxidant from the packaging material are slowed to a point where further encapsulation of the antioxidant is not required.

While the inventor does not wish to be bound to any particular theory of how the invention works, it is believed that the inventive packaging material operates in two ways to retard the oxidation of the flavor component of an individual chewing gum stick packaged therein. First, in order to reach the chewing gum stick, a quantity of oxygen must pass through the packaging material. It is believed that much of this oxygen, when passing through the packaging material, is intercepted by the free antioxidant and is caused to react to form a substantially inert compound. Second, it is believed that some of the free antioxidant in the packaging material migrates gradually toward the surface of the chewing gum stick. Consequently, any oxygen which successfully passes through the packaging material has a greater chance of being intercepted at the surface of the chewing gum stick due to the fact that antioxidant can diffuse to the surface of the chewing gum both from inside the chewing gum stick and from the packaging material.

With the foregoing in mind, it is a feature and advantage of the invention to provide an inexpensive, relatively simple packaging material for chewing gum sticks which can be mass produced with relative ease and which extends the shelf life of chewing gum sticks.

It is also a feature and advantage of the invention to provide chewing gum sticks having prolonged shelf life due to the presence of antioxidant in the packaging material.

It is also a feature and advantage of the invention to provide a method of prolonging the shelf life of chewing gum sticks.

The foregoing and other features and advantages of the invention will become further apparent from the following detailed description of the presently preferred embodiments, when read in conjunction with the accompanying example. It is understood that the detailed description and example are to be construed as illustrative rather than limitative, with the scope of the invention being defined by the appended claims and equivalents thereof.

DETAILED DESCRIPTION OF THE PRESENTLY PREFERRED EMBODIMENTS

In accordance with the invention, a chewing gum stick is provided which, typically, has a flat, rectangular shape, but which may have other configurations as well. While chewing gum sticks are well known in the art, it should be noted that typical chewing gum sticks have a length of about 73 millimeters, a width of about 19 millimeters, and a thickness of about 1.65–1.82 millimeters. The chewing gum stick can be mint flavored or can, alternatively, include other flavors as discussed below. In order to prolong the shelf life and, particularly, maintain the flavor quality of the chewing gum stick, the chewing gum is packaged using a material which includes a middle layer of tissue paper laminated on both sides with layers of wax mixed with minor quantities of antioxidant.

The tissue layer can be any cellulose-containing material which is light enough and thin enough to wrap, economically and without undue difficulty, around individual chewing gum sticks. The tissue paper should generally have a thickness of about 0.0014 to about 0.0026 inches. The tissue paper should generally have a basis weight of about 19–30 pounds per ream, with a ream being equal to 3000 square feet. Tissue paper having a basis weight of 19 pounds per ream typically has a thickness of 0.0014–0.0016 inch. Tissue paper having a basis weight of 24 pounds per ream typically has a thickness of 0.0021–0.0023 inch. Tissue paper having a basis weight of 30 pounds per ream typically has a thickness of 0.0024–0.0026 inch.

The tissue paper is coated on both sides with wax. The wax should be applied at a weight of about 3–7 pounds per ream, preferably about 5 pounds per ream, with these quantities being applied to both sides of the tissue paper. Thus, the coated tissue paper should have a total basis weight of about 25–44 pounds per ream. Each layer of wax should be about 0.0002 to about 0.0007 inch thick, preferably about 0.0004 inch thick, on the outside of the tissue paper. Additionally, the tissue paper may be saturated with wax. Thus, the coated tissue paper should have a total thickness of about 0.0018 to about 0.0040 inch, preferably about 0.0022 to about 0.0034 inch.

Types of wax which are suitable for use in the invention include paraffin wax, carnauba wax, beeswax, polyethlene wax, microcrystalline wax, candellia wax, and combinations thereof. Of these, paraffin wax is the most preferred. Other types of wax can also be used. The most important function of the wax is that it forms a protective barrier between the chewing gum and the environment. This function is important in order to minimize the diffusion of oxygen into the chewing gum.

Each layer of wax includes a minor quantity of free antioxidant blended with the wax. The antioxidant should constitute about 50 ppm to about 500 ppm based on the weight of the wax, preferably about 100 ppm to about 200 ppm, most preferably about 160 ppm. Antioxidants which are suitable for use in the invention include butylated hydroxytoluene (BHT), butylated hydroxyanisole (BHA), tertiary butyl hydroquinone (TBHQ), propyl gallate, and combinations thereof. Of these, the most preferred antioxidant is BHT. Other types of antioxidants can also be used. The most important functions of the antioxidant are to reduce the oxidation of the wax and scavenge oxygen that attempts to diffuse through the wax. Also, some of the antioxidant from the wax migrates toward the chewing gum surface and scavenges oxygen that reaches the chewing gum. These functions are important in order to prevent the wax from degrading, cracking and chipping, and to reduce the oxidation of chewing gum components, thereby prolonging the shelf life of the chewing gum.

The wax-coated tissue paper of the invention can be prepared as follows. Initially, the wax and antioxidant are blended together to form a homogeneous mixture. The mixing should take place at a temperature which is at least about 5° C. higher than the melting point of the wax, for a time period long enough to effect a thorough blending.

The tissue paper can be run through a flexo-roto printing station in order to coat the tissue paper evenly with wax on one side. The printing station is useful because it provides a vehicle for coating the tissue paper uniformly and evenly with wax. By this method, the wax is applied in much the same fashion as ink. Other methods of applying the wax can also be used.

Next, the wax-coated tissue paper is lightly pressed between a pair of rollers, preferably Teflon ®-coated rollers, which are heated to a temperature higher than the melting temperature of the wax. The pressing of the rollers causes some of the wax, which is initially deposited on only one side of the tissue paper, to saturate the tissue paper and diffuse to the other side.

The tissue paper can initially be coated using dry powdered wax or hot molten wax. Depending on whether the wax is initially hot, and depending on the amount of heat applied by the pressure rollers, it may be desirable to quench the wax coated tissue paper after it leaves the pressure rollers. Quenching can be accomplished by running the wax coated tissue paper through a standard water bath.

Alternative methods can also be employed for coating the tissue paper with wax. For instance, the tissue paper can be initially laminated on both sides with the mixture of wax and antioxidant. Any suitable lamination equipment can be used for this purpose. The tissue paper can be coated on both sides simultaneously, or can be coated first on one side, and then on the other side. More than one coating of wax and antioxidant may be applied to the surfaces of the tissue paper, as necessary, in order to obtain the desired layer thickness.

The coated tissue paper of the invention can be used to package and stabilize any brand of stick chewing gum, but is particularly suitable for packaging mint flavored chewing gums due to their susceptibility to oxidation. A chewing gum composition typically includes a water soluble bulk portion, a water insoluble chewing gum base portion and one or more flavoring agents. The water soluble portion (including the flavoring agents) dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

The flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. The flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to those skilled in the art. The following example is not to be construed as imposing limitations on the invention, but is included merely to illustrate preferred embodiments.

EXAMPLE 1

A chewing gum sample was prepared having the following formulation:

| Ingredient | Weight Percent |
| --- | --- |
| Gum base | 26.55 |
| Sorbitol | 20.656 |
| Powdered xylitol | 36.59 |
| Glycerin | 1.48 |
| Mannitol | 7.90 |
| Syrup | 4.77 |
| Peppermint oil | 1.71 |
| Encapsulated aspartame | 0.244 |
| Liquid lecithin | 0.10 |
| TOTAL | 100.00 |

*Coevaporated blend of Lycasin brand hydrogenated starch hydrolysate and glycerin.

The chewing gum sample was cut into sticks each having a length of 73 mm, a width of 19 mm, and a thickness of 1.65–1.82 mm.

Carambar tissue paper having an initial thickness of about 38 microns (0.0015 in.) and a basis weight of 19 pounds per ream, was coated with a paraffin wax/antioxidant mixture using a flexo-roto printing station. The wax contained 160 ppm of butylated hydroxytoluene (BHT). Initially, one side of the tissue paper was covered with the molten mixture of wax and antioxidant. Then, the coated paper was lightly pressed between two stainless steel rollers, causing some of the wax/antioxidant mixture to saturate the tissue paper and migrate to the other side. Finally, the coated tissue paper was quenched using a water bath and dried.

The dried coated tissue paper had a total thickness (including wax and antioxidant) of 45±5 microns (0.0018 in.) and a total basis weight of 52 grams per square meter (31.92 pounds per ream). The coated tissue paper was cut into individual wrappers, each having an open length of 3.438 inches, a width of 1.844 inches and a total thickness of 0.0018 inches. The coated tissue paper wrappers were used to wrap the chewing gum sticks prepared as described above. An equal number of individual chewing gum sticks were wrapped using conventional aluminum foil wrappers each having an open length of 3.438 inches, a width of 1.844 inches, and a thickness of about 0.106 inches.

The packaged chewing gum sticks were tested for air leakage as follows. A 4 mm hole was punched into each tested package, completely piercing the package on one side and the stick of gum. The package was placed hole side down and was completely submerged in water. The escape of air from the top of the package was then measured using standard air transmission measurement techniques. It was found that the individually packaged sticks using the wax and antioxidant coated tissue wrappers had faster leakage rates than the individually packaged sticks using the conventional aluminum foil wrappers, meaning that package leakage rates were biased against the invention and were not a helpful factor in the subsequent aging tests and sensory analysis of the chewing gum.

Some of the chewing gum sticks wrapped in the coated tissue paper and some of the chewing gum sticks wrapped in the aluminum foil were stored under accelerated aging conditions (85° F., 70% relative humidity) for ten weeks. Some of the chewing gum sticks wrapped in the coated tissue paper and some of the chewing gum sticks wrapped in the aluminum foil were stored under different accelerated aging conditions (85° F., 35% relative humidity) for ten weeks. After ten weeks, the chewing gum sticks were evaluated by a panel of five trained sensory panelists.

The trained sensory panelists evaluated the chewing gum sticks by chewing each sample for a total of 4 minutes and noting the sensory characteristics of each sample. In each case, the chewing gum sticks packaged in the coated tissue paper wrappers of the invention were perceived as having better, longer lasting flavor quality and intensity than the chewing gum sticks packaged in the conventional aluminum foil wrappers. In particular, the chewing gum sticks packaged in the coated tissue paper wrappers of the invention were characterized as having cleaner peppermint flavor than the controls and no oxidized or peanut shell flavor notes.

While the embodiments of the invention disclosed herein are presently considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A stabilized, packaged chewing gum stick, comprising:
   a chewing gum stick comprising a water soluble bulk portion, a water insoluble chewing gum base portion, and one or more flavoring agents; and
   a chewing gum wrapper surrounding the chewing gum stick consisting essentially of a middle layer of tissue paper, a first outer layer of wax mixed with free antioxidant, and a second outer layer of wax mixed with free antioxidant, the first and second outer layers being coated on both sides of the tissue paper;
   whereby the free antioxidant in the chewing gum wrapper is not encapsulated except for being mixed with the wax, and retards oxidation of the one or more flavoring agents in the chewing gum stick, thereby prolonging the shelf life of the chewing gum stick.

2. The stabilized, packaged chewing gum stick of claim 1, wherein the one or more flavoring agents comprises a mint oil.

3. The stabilized, packaged chewing gum stick of claim 1, wherein the uncoated tissue paper has a thickness of about 0.0014 to about 0.0026 inches.

4. The stabilized, packaged chewing gum stick of claim 3, wherein the coated tissue paper has a thickness of about 0.0018 to about 0.0040 inches.

5. The stabilized, packaged chewing gum stick of claim 1, wherein the uncoated tissue paper has a basis weight of about 19 to about 30 pounds per ream.

6. The stabilized, packaged chewing gum stick of claim 5, wherein the coated tissue paper has a basis weight of about 25 to about 44 pounds per ream.

7. The stabilized, packaged chewing gum stick of claim 1, wherein the wax comprises a material selected from the group consisting of paraffin wax, carnauba wax, beeswax, polyethylene wax, microcrystalline wax, candellia wax and combinations thereof.

8. The stabilized, packaged chewing gum stick of claim 1, wherein the wax comprises paraffin wax.

9. The stabilized, packaged chewing gum stick of claim 1, wherein the wax comprises about 50 ppm to about 500 ppm free antioxidant.

10. The stabilized, packaged chewing gum stick of claim 1, wherein the wax comprises about 100 ppm to about 200 ppm free antioxidant.

11. The stabilized, packaged chewing gum stick of claim 1, wherein the wax comprises about 160 ppm free antioxidant.

12. The stabilized, packaged chewing gum stick of claim 1, wherein the antioxidant comprises a material selected from the group consisting of butylated hydroxytoluene, butylated hydroxyanisole, tertiary butyl hydroquinone, propyl gallate, and combinations thereof.

13. The stabilized, packaged chewing gum stick of claim 1, wherein the antioxidant comprises butylated hydroxytoluene.

14. A method of preparing a stabilized, packaged chewing gum stick, comprising the steps of:
  preparing a chewing gum stick comprising a water soluble bulk portion, a water insoluble chewing gum base portion, and one or more flavoring agents;
  blending a quantity of wax with a minor quantity of free antioxidant to form a homogeneous mixture comprising about 50 ppm to about 500 ppm free antioxidant by weight of the wax;
  providing a quantity of tissue paper having an uncoated thickness of about 0.0014 to about 0.0026 inches and a basis weight of about 19 to about 30 pounds per ream;
  coating the mixture of wax and free antioxidant onto both sides of the tissue paper to form a wrapper consisting essentially of coated tissue paper having a total thickness of about 0.0018 to about 0.0040 inches, with the wax contributing about 0.0004 to about 0.0014 inches of the total thickness; and
  wrapping the coated tissue paper around the chewing gum stick;
  whereby the free antioxidant in the coated tissue paper is not encapsulated except for being mixed with the wax, and retards oxidation of the one or more flavoring agents in the chewing gum stick, thereby prolonging the shelf life of the chewing gum stick.

15. The method of claim 14, wherein the one or more flavoring agents comprises a mint oil.

16. The method of claim 14, wherein the coating is accomplished by applying the wax and antioxidant to one side of the tissue paper and pressing the coated tissue paper so as to cause some of the wax to saturate the tissue paper and migrate to the other side.

17. The method of claim 14, wherein the wax and antioxidant are applied to the tissue paper while the wax is in a molten state.

18. The method of claim 14, wherein the wax and antioxidant are applied to the tissue paper in the form of a powder.

19. The method of claim 14, further comprising the step of cutting the coated tissue paper to form individual chewing gum wrappers.

20. The method of claim 14, wherein the wax comprises a material selected from the group consisting of paraffin wax, carnauba wax, beeswax, polyethylene wax, microcrystalline wax, candellia wax, and combinations thereof.

21. The method of claim 14, wherein the wax comprises a paraffin wax.

22. The method of claim 14, wherein the antioxidant comprises a material selected from the group consisting of butylated hydroxytoluene, butylated hydroxyanisole, tertiary butyl hydroquinone, propyl gallate, and combinations thereof.

23. The method of claim 14, wherein the antioxidant comprises butylated hydroxytoluene.

24. The method of claim 16, wherein the wax and antioxidant are applied to the tissue paper using a flexo-roto printing station.

25. The method of claim 14, wherein the mixture of wax and antioxidant is laminated onto both sides of the tissue paper.

* * * * *

UNITED STATES PATENT AND TRADEMARK OFFICE
CERTIFICATE OF CORRECTION

PATENT NO. : 5,362,500
DATED : November 8, 1994
INVENTOR(S) : Pamela M. Mazurek et al.

It is certified that error appears in the above-indentified patent and that said Letters Patent is hereby corrected as shown below:

In line 7 of the table in Column 6, after "Syrup" insert --*--.

Signed and Sealed this

Ninth Day of April, 1996

Attest:

BRUCE LEHMAN

Attesting Officer　　　　Commissioner of Patents and Trademarks